(12) United States Patent
Shimokawa et al.

(10) Patent No.: US 7,898,698 B2
(45) Date of Patent: Mar. 1, 2011

(54) METHOD AND DEVICE FOR CREATING PRINT DATA, PROGRAM FOR CREATING PRINT DATA, AND COMPUTER-READABLE RECORDING MEDIUM CONTAINING THE PROGRAM

(75) Inventors: Kozo Shimokawa, Hiroshima (JP);
Yoshiaki Rokuhara, Hiroshima (JP);
Takafumi Tanimoto, Hiroshima (JP)

(73) Assignee: Ryobi Ltd., Fuchu-shi, Hiroshima (JP)

( * ) Notice: Subject to any disclaimer, the term of this patent is extended or adjusted under 35 U.S.C. 154(b) by 609 days.

(21) Appl. No.: 10/582,183

(22) PCT Filed: Dec. 7, 2004

(86) PCT No.: PCT/JP2004/018213

§ 371 (c)(1),
(2), (4) Date: Jun. 8, 2006

(87) PCT Pub. No.: WO2005/057282

PCT Pub. Date: Jun. 23, 2005

(65) Prior Publication Data

US 2007/0103733 A1    May 10, 2007

(30) Foreign Application Priority Data

Dec. 9, 2003  (JP) .............................. 2003-410195

(51) Int. Cl.
*H04N 1/40* (2006.01)
*G06K 15/00* (2006.01)
*B41F 5/16* (2006.01)

(52) U.S. Cl. .................... 358/3.29; 358/1.9; 101/181

(58) Field of Classification Search .............. 358/1.9, 358/504, 518, 1.12, 3.29; 101/181
See application file for complete search history.

(56) References Cited

U.S. PATENT DOCUMENTS 6,580,524 B1 * 6/2003 Weichmann et al. ......... 358/1.9

(Continued)

FOREIGN PATENT DOCUMENTS

DE    19632674 A1    4/1997

(Continued)

OTHER PUBLICATIONS

PCT/US92/00314, Presstek, Inc., Jan. 7, 1992.

(Continued)

*Primary Examiner* — Benny Q Tieu
*Assistant Examiner* — Sunil Chacko
(74) *Attorney, Agent, or Firm* — Perkins Coie LLP

(57) ABSTRACT

There are provided a method and a device for creating print data, a program for creating print data, and a recording medium capable of accurately adjusting the position of the print image of pre-printing with the print image of post-printing when performing CTP printing, regardless of generation of fan-out, without performing control of the position correction of the imaging device in the printing plate creation device or without correcting the image position when creating a printing plate of the data for creating digitized printing plate. Deformation information on the direction of expansion/contraction to be performed on an object to be printed is set and expansion/contraction correction of the direction corresponding to the expansion/contraction is performed for the image type data on the print data according to the corresponding position data the deformation information.

5 Claims, 9 Drawing Sheets

U.S. PATENT DOCUMENTS

| | | | |
|---|---|---|---|
| 6,637,327 B2 * | 10/2003 | Endo et al. | 101/181 |
| 6,729,239 B2 * | 5/2004 | Edamitsu et al. | 101/485 |
| 6,999,200 B2 * | 2/2006 | Shiraishi | 358/1.9 |
| 2002/0139259 A1 | 10/2002 | Endo et al. | |
| 2002/0148376 A1 | 10/2002 | Edamitsu et al. | |

FOREIGN PATENT DOCUMENTS

| | | |
|---|---|---|
| DE | 10110640 A1 | 10/2001 |
| EP | 1254767 A1 | 8/2001 |
| EP | 1245384 A2 | 3/2002 |
| JP | 09-109356 | 4/1997 |
| JP | 09-258424 | 10/1997 |
| JP | 09-323471 | 12/1997 |
| JP | 2000-229455 | 8/2000 |
| JP | 2000-326473 | 11/2000 |
| JP | 2001-320595 | 11/2001 |
| JP | 2002-029032 | 1/2002 |
| JP | 2002-059526 | 2/2002 |
| JP | 2002-067268 | 3/2002 |
| JP | 2002-237959 | 8/2002 |
| JP | 2002-287374 | 10/2002 |
| JP | 2002-361817 | 12/2002 |
| JP | 2003-118176 | 4/2003 |

OTHER PUBLICATIONS

PCT/JP04/018213, Ryobi Ltd, Dec. 7, 2004.
PCT/JP01/06762, Dainippon Screen Mfg Co Ltd, Aug. 6, 2001.
Office Action issued by the German Patent and Trade Mark Office, dated May 18, 2009 for corresponding German Patent Application No. 11 2004 002 429.3-51 (and an English translation thereof).

* cited by examiner

METHOD AND DEVICE FOR CREATING PRINT DATA, PROGRAM FOR CREATING PRINT DATA, AND COMPUTER-READABLE RECORDING MEDIUM CONTAINING THE PROGRAM

PRIORITY

This application is a 35 U.S.C. §371 application of International Application No. PCT/JP2004/018213 filed on Dec. 7, 2004, designating the United States; which claims priority to Japanese Patent Application No. 2003-410195, filed Dec. 9, 2003, both of which are hereby incorporated by reference in their entirety.

TECHNICAL FIELD

The present invention relates to a method and a device for creating print data, a program for creating print data, and a computer-readable recording medium containing the program.

RELATED ART

In a printing press (e.g., a multi-color printing press) for sequentially printing a plurality of print images (e.g., print images of a plurality of basic colors such as cyan (C), magenta (NI), yellow (Y), and black (K) different from each other), on a printing medium (e.g., a printing sheet) using a plurality of printing plates corresponding to the plurality of print images, in general, ink, or ink and water are supplied to the respective printing plates, and the print images (e.g., a multi-color print image) is printed on the printing medium by sequentially transferring the ink to the printing medium, which is transferred in a predetermined transfer direction from the respective printing plates with the ink or the like having been supplied thereto. At this time, the print images are printed by the use of the printing plates so that the print images on the printing medium are matched in print position to each other.

In the field of printing technologies using the printing plates, a CTP (Computer To Plate) printing method in which printing plates are directly created on the basis of data corresponding to the print images has attracted attention. Examples of a printing technique of the CTP printing method can include: (a) a technique that print data (e.g., print data created in a page description language (PDL) such as Post-Script (registered trademark) made by Adobe Systems CO.) corresponding to print images are created by the use of a print data creation device (e.g., a layout edition software installed on a computer), then the created print data are converted into printing-plate creation data (e.g., raster data developed in a bit map) by the use of a device for producing a printing-plate creation data (e.g., a RIP (raster image processor) or a device with a software RIP installed on a computer), then the converted printing-plate creation data are binarized (e.g., dot-processed), then printing plates are created using a printing plate creation device on the basis of the binarized (e.g., dot-processed and mesh-developed) printing-plate creation data, and then the print is performed to a printing medium by mounting the thus created printing plates to a printing press; and (b) a technique that, like in Item (a) described above, print data corresponding to print images are created using a print data creation device, binarized printing-plate creation data are produced by the use of a device for producing printing-plate creation data on the basis of the created print data, the printing plates are created by the use of a printing press (more specifically, a DI (direct imaging) printing press of an on-press type that enables creation of printing plates in a printing press) provided with a printing plate creation device on the basis of the binarized printing-plate creation data, and the print is performed using the created printing plates.

Patent Document 1: Publication No. Hei-6-507353 of Japanese Translation of a PCT application
Patent Document 2: Japanese Unexamined Patent Application Publication No. Hei-9-109356 (Japanese Patent No. 3303628)
Patent Document 3: Japanese Unexamined Patent Application Publication No. Hei-9-258424
Patent Document 4: Japanese Unexamined Patent Application Publication No. Hei-9-323471
Patent Document 5: Japanese Unexamined Patent Application Publication No. 2002-29032
Patent Document 6: Japanese Unexamined Patent Application Publication No. 2002-67268
Patent Document 7: Japanese Unexamined Patent Application Publication No. 2002-361817

SUMMARY OF THE INVENTION

Problems to be Solved by the invention

In any technique, when the print is performed using a printing press (e.g., a multi-color printing press) using a plurality of printing plates, a printing medium (e.g., printing sheet) may be deformed (or deformed from a shape which is usually a rectangular shape to a shape approximate to a trapezoid) due to elongation and contract caused depending printing conditions such as quality (type, size, and thickness) of the printing medium, pressure acting on the printing medium at the time of printing, and an amount of water to be used. Accordingly, for example there often occurs a phenomenon that a previously printed print image and a subsequently printed print image are different in position and thus positions of the print images C, M, Y, and K are deviated from each other, thereby causing deterioration in print quality. As the number of printing plates increases, the influence of the phenomenon increases.

In order to solve the problem in the CTP printing method, in a case of Item (a) described above, for example as shown in FIG. 7(A), by installing a device 30 for correcting an imaging unit 41 for forming an image corresponding to a print image on a non-created printing plate in a printing plate creation device 40, a printing-plate-creation-data producing device (e.g., a RIP) 20 creates binarized printing-plate creation data, for example, developed in a RIP manner on the basis of print data created by a print data creation device 10', and the device 30 controls the imaging unit 41 when the printing plate creation device 40 sequentially creates a plurality of printing plates Ac', Am', Ay', and Ak' on the basis of the binarized printing-plate creation data, thereby correcting positions of images (that is, dot (pixel) printing positions on the printing plates) at the time of creating the printing plates. In Item (b) described above, for example, as shown in FIG. 7(B), by installing devices 30 for correcting imaging units in respective printing plate creation devices 40c, 40m, 40y, and 40k, a printing-plate-creation-data producing device (e.g., a RIP) 20 produces binarized printing-plate creation data, for example, developed in a RIP manner on the basis of print data created by a print data creation device 10', and the devices 30 respectively control the imaging units 41 when the printing plate creation devices 40c, 40m, 40y, and 40k sequentially create a plurality of printing plates Ac', Am', Ay', and Ak' on the basis of the binarized printing-plate creation data, thereby correcting positions of images (i.e., dot (pixel) printing positions on the printing plates) at the time of creating the printing plates (e.g., see Patent Documents 1, 5, 6, and 7).

However, as described above, in the printing techniques of correcting printing positions of the binarized printing-plate creation data on the printing plates, for example, after mesh-developing the printing-plate creation data in a RIP manner, since the imaging units in the printing plate creation device are required to be controlled, it is necessary to install a correction device for each imaging unit. Accordingly, in comparison with a prior art, additional devices are required, which leads to increase in cost for those devices, and it is difficult to stably operate the printing plate creation device. In addition, by correcting the positions of images in the printing-plate creation data at the time of creating the printing plates after developing the printing-plate creation data in a RIP manner, there may occur a case where imaging dots (pixels), which are not originally connected to each other in the printing-plate creation data, are connected to each other, or the imaging dots, which are originally connected to each other, are disconnected from each other, thereby causing deterioration in printing quality due to the correction in the positions of images at the time of creating the printing plates.

Therefore, there has been proposed a printing technique for correcting the positions of images at the time of creating print data which are processed by a print data creation device 10' (a device with imposition software or the like installed on a computer) shown in FIG. 7(C) (see Patent Documents 2, 3, and 4, for example).

However, since each printing medium is transferred with a leading end thereof held or clamped during a printing operation, while being forcedly drawn through cylinders such as pressing cylinders, rubber cylinders and the like, thereby often causing a phenomenon (so-called fan-out phenomenon) that the printing medium is gradually elongated, as exaggerated in FIG. 8, (or elongated in a trapezoidal shape as shown in the Figure) in a transfer direction X and/or a direction (a Y direction in the Figure) crossing the transfer direction X from the most downstream side to the most upstream side in the transfer direction (indicated by X in the Figure) of the printing medium (e.g., a printing sheet Q). This phenomenon tends to be more remarkable with repetition of printing, thereby deviating the positions of the print images C, M, Y, and K as much. In this case, the elongated amounts Ml and Mr of the printing medium (e.g., the printing sheet Q) are different from each other at the most downstream side and at the most upstream side in the transfer direction X. In the conventional printing techniques for performing the correction of positions at the time of creating the print data which is processed by the print data creation device, since the problem with the fan-out phenomenon is considered only in units of a group (units of a page), but not considered for all the elements constituting the print data, it is not possible to satisfactorily cope with the problem. The elongation in the Y direction is shown in FIG. 8 and Ml and Mr in the Figure denote the amounts laterally elongated at the time of printing a black image. These elongation amounts Ml and Mr may be substantially equal to each other, but may not be equal to each other. In FIG. 8, the elongation amounts Ml and Mr are proportionally increased from the most downstream to the most upstream side in the transfer direction (the X direction in the Figure), but may not be proportionally increased.

More specifically, when the position correction is performed in units of a page as described above, as shown in FIG. 9(A), the print data in which the positions are corrected in units of a page arranged on a printing plate A' are created. When the print data are created in this way and the pages Pa constituting the printing plate A' are arranged (or imposed) on the printing plate A', the positions of the pages Pa are corrected every page Pa and the position correction in units of a page is performed every printing plate (e.g., printing plates Ac', Am', Ay', and Ak' for the print images C, M, Y, and K) (so-called registration adjustment print) so as to cope with the problem. However, since the position correction is performed in units of a page, it is not possible to cope with a trapezoidal shape, a deformation of the printing sheet Q, and more specifically, not possible to cope with the positional deviation, which is different between the most downstream side and the most upstream side in the sheet transfer direction X in each page. Furthermore, it is not possible to cope with a print matter not divided page by page.

On the contrary, by physically deforming the printing plates in an elongation or contraction manner when providing the printing plates in a printing press, the correction of positions is performed. For example, as shown in FIG. 9(B), when the printing plate A' is mounted to the printing press, the printing plate A' is deformed by elongating or contracting the printing plate in the Y direction crossing the sheet transfer direction X by the use of a device for fixing a gripped tail end of the printing plate A'. In this case, such a correction of positions is advantageous in the vicinity of the gripped tail end where the printing plate A' is deformed, but there is little influence on the entire printing plate A' without any advantages. When the printing plate A' is deformed to be elongated in this way, the printing plate can be easily deformed in a horn-like shape, but can be little deformed in a trapezoid such as the shape of the printing sheet Q (see FIG. 8). Accordingly, it is unlikely to obtain a print image satisfactory in quality.

The present invention has been conceived to solve the above-mentioned problems. It is an object of the present invention to provide a method and a device for creating print data that can omit the necessity to control the positional correction of each imaging device in a printing plate creation device for the operation of a CTP printing and hence omit the necessity to provide a correction device in each imaging device, thereby reducing the costs for it; omit the necessity to correct the positions of images when creating the printing plates for the binarized (e.g., mesh-developed) printing-plate creation data and therefore can prevent deterioration in image quality due to the correction in positions of the images at the time of creating the printing plate; and can match the positions of the previously printed print image and the subsequently printed print image with each other with excellent precision, regardless of a difference in amount of deviation of the images between the most downstream side and the most upstream side in the transfer direction of the printing medium in a page due to a phenomenon, that is, a so-called fan-out phenomenon, that the printing medium is elongated (or elongated in a trapezoidal shape) in the transfer direction and/or the direction crossing the transfer direction from the most downstream side to the most upstream side in the transfer direction of the printing medium.

Means for Solving the Problems

In order to accomplish the above-mentioned object, the present invention provides a method of creating print data, a device for creating print data, and a program for creating print data, as well as a recording medium containing the program as follows.

(1) Method of Creating Print Data

There is provided a method of creating print data, in which prior to creating a plurality of printing-plate creation data for respectively creating a plurality of printing plates in sequentially printing (or, for example, printing with a multi-color printing press) a plurality of print images (e.g., print images of a plurality of basic colors such as cyan (C), magenta (M), yellow (Y), and black (K) different from each other) on a printing medium by the use of the plurality of printing plates respectively corresponding to the plurality of print images; a plurality of print data, each of which includes an image type data for at least one image type constituting the corresponding print image and a position data for determining at least one of an image type position data corresponding to a position of the image type in the print image and an image type shape data indicating a shape of the image type, are created, the method comprising: a deformation information input step of setting deformation information on an amount of elongation or contraction in a direction in which the printing medium is to be elongated or contracted when each print is made in printing operation for the plurality of print images on the printing medium by the use of the plurality of printing plates; and a correction step of correcting at least one image type data constituting at least one of the plurality of print images in terms of elongation or contraction in the direction in which the printing medium is to be elongated or contracted, on the basis of the corresponding position data and the deformation information set in the deformation information input step.

(2) Print Data Creation Device

There is provided a device for creating print data, in which prior to creating a plurality of printing-plate creation data for respectively creating a plurality of printing plates in sequentially printing (or, for example, printing with a multi-color printing press) a plurality of print images (e.g., print images of a plurality of basic colors such as cyan (C), magenta (M), yellow (Y), and black (K) different from each other) on a printing medium by the use of the plurality of printing plates respectively corresponding to the plurality of print images; a plurality of print data, each of which includes an image type data for at least one image type constituting the corresponding print image and a position data for determining at least one of an image type position data corresponding to a position of the image type in the print image and an image type shape data indicating a shape of the image type, are created, the device comprising: a deformation information input means of setting deformation information on an amount of elongation or contraction in a direction in which the printing medium is to be elongated or contracted when each print is made in printing operation for the plurality of print images on the printing medium by the use of the plurality of printing plates; and a correction means of correcting at least one image type data constituting at least one of the plurality of print images in terms of elongation or contraction in the direction in which the printing medium is to be elongated or contracted, on the basis of the corresponding position data and the deformation information set by the deformation information input means.

(3) Program for Creating Print Data

There is provided a program for creating print data, the program serving to make a computer execute the steps of the method of creating print data described above according to the present invention.

(4) Recording Medium

There is provided a computer-readable recording medium containing the program for creating print data described above according to the present invention.

In the present invention, by the "image type data for at least one image type constituting the print image" described above is meant, for example, code data (hereinafter, referred to as character data) for expressing characters with predetermined codes, vector data (hereinafter, referred to as figure data) such as CAD data for expressing a figure with a plurality of coordinate information using numerical expressions or the like, and raster data (hereinafter, referred to as image data) for expressing an image with a plurality of pixel information or the like of a photograph image or a scanned image scanned by a scanner or the like.

The device for creating print data according to the present invention can execute the method of creating print data according to the present invention, and may include a layout editor and/or an imposition device. The program for creating print data according to the present invention may be installed as a device for creating print data on a computer. The computer on which the program for creating print data according to the present invention is installed may include layout edition software and/or imposition software. In any case, as for the at least one image type data constituting at least one of the plurality of print images, print data which have been corrected in terms of elongation or contraction in the direction, in which the elongation or contraction is to be made, on the basis of the corresponding position data and the deformation information set in the deformation information input step and by the deformation information input means.

The thus created print data are converted into print-plate creation data (e.g., raster data developed in a bit map) by a printing-plate-creation-data producing device in a printing-plate creation system, the converted print-plate creation data are binarized (e.g., dot-processed), the printing plates are created by the printing plate creation device on the basis of the binarized (e.g., dot-processed and mesh-developed) printing-plate creation data, and then the created printing plates are provided to a printing press, thereby performing a printing process to the printing medium. Alternatively, the binarized printing-plate creation data are produced by the printing-plate-creation-data producing device, the printing plates are created by the printing press (e.g., a DI printing press) having the printing plate creation device, and the printing process is performed to the printing medium by the use of the created printing plates.

Thus, according to the method of creating print data, the device for creating print data, the program for creating print data, and the recording medium, of the present invention, since the elongation/contraction correction of the print data is performed prior to creating the printing-plate creation data for creating a printing plate by the use of the printing plate creation device installed in a printing plate creation device or a DI printing press in the CTP printing, the correction control of the imaging unit in the printing plate creation device does not have to be performed. Accordingly, since it is not necessary to install a correction device in each imaging unit, it is possible to reduce the cost for the device as much and to stably operate the printing plate creation device. In addition, since the print data are subjected to the elongation/contraction correction and the binarizing process prior to binarizing the printing-plate creation data, the image positions in binarized printing-plate creation data does not have to be performed at the time of creating the printing plates. Accordingly, it is possible to prevent deterioration in print quality due to the correction of the image positions at the time of creating the printing plates.

In the correction step and the correction means, as for the at least one image type data constituting at least one of the plurality of print images, the print data which are subjected to an elongation/contraction correction in a direction corresponding to the elongation/contraction direction are created on the basis of the corresponding position data and the deformation information set in the deformation information input step and set by the deformation information input means. Accordingly, for example, even when the phenomenon, that is, the so-called fan-out phenomenon, that the printing medium is elongated in the transfer direction of the printing medium and/or the direction crossing the transfer direction from the most downstream side to the most upstream side in the transfer direction of the printing medium occurs and thus the amount of deviation in a page is different between the most downstream side and the most upstream side in the transfer direction of the printing medium, it is possible to create the print data so as to be more close to the deformed shape of the printing medium, by performing the elongation/contraction correction in the transfer direction and/or the direction crossing the transfer direction from the most downstream side to the most upstream side in the transfer direction of the printing medium. Accordingly, it is possible to match the positions of the previously printed print image and the subsequently printed print image with excellent precision, thereby improving the print quality.

Examples of the print data can include page description language (hereinafter, referred to as PDL) data and electronic document format data. Typical examples of the PDL data can include PostScript (registered trademark) (hereinafter, abbreviated as PS) data made by Adobe Systems Co. Typical examples of the electronic document format data can include PDF (Portable Document Format) data developed by Adobe Systems Co. In view of easy correction of data, the elongation/contraction correction is preferably performed to the electronic document format data, specifically, the PDF data. Examples of creating the PDF data can include: a case where the PDF data are directly created by the layout editor and/or the imposition device, or the layout edition software and/or the imposition software installed on a computer, in the CTP printing; and a case where the PDF data are converted on the basis of the print data (typically, PDL data such as PS data) created by the layout editor and/or the imposition device, or the layout edition software and/or the imposition software installed on a computer, in the CTP printing. In any case, the PDF data are created as a plurality of PDF data (that is, a plurality of PDF data divided into plates) respectively corresponding to the plurality of print data. In this case, in the method and the device for creating print data according to the present invention, the following examples can be considered.

(a) A case where the elongation/contraction correction is performed to a plurality of print data divided into plates (e.g., a plurality of PDF data divided into plates) respectively corresponding to the plurality of print images created by the layout editor and/or the imposition device or the layout edition software and/or the imposition software installed on a computer. In this case, in the correction step and means, the elongation/contraction correction in a direction corresponding to the direction in which the elongation or contraction is to be made may be performed to the at least one image type data in at least one of the plurality of PDF data divided into plates corresponding to the plurality of print images, on the basis of the corresponding position data and the deformation information set by the deformation information input step and means.

(b) A case where a plurality of print data divided into plates (e.g., a plurality of PDL data divided into plates (more specifically, a plurality of PS data divided into plates)) respectively corresponding to the plurality of print images created by the layout editor and/or the imposition device or the layout edition software and/or the imposition software installed on a computer is once converted into a plurality of PDF data divided into plates respectively corresponding to the plurality of print data, and then the elongation/contraction correction is performed to the plurality of converted PDF data. In this case, the correction step and means include a PDF conversion step and means for converting the plurality of PDL data divided into plates (more specifically, the plurality of PS data divided into plates) corresponding to the plurality of print images into the plurality of PDF data divided into plates corresponding to the plurality of print images, and the elongation/contraction correction in a direction corresponding to the direction in which elongation or contraction is to be made may be performed to the at least one image type data in at least one of the plurality of PDF data divided into plates and converted by the PDF conversion step and means, on the basis of the corresponding position data and the deformation information set by the deformation information input step and means.

(c) A case where PDF data not divided into plates (e.g., a single PDF data) created by the layout editor and/or the imposition device or the layout edition software and/or the imposition software installed on a computer are once converted into a plurality of PDF data divided into plates respectively corresponding to the plurality of print image, and then the elongation/contraction correction is performed to the plurality of converted PDF data divided into plates. In this case, the correction step and means include a PDF division step and means for dividing the PDF data not divided into plates (e.g., a single PDF data) into the plurality of PDF data divided into plates respectively corresponding to the plurality of print images, and the elongation/contraction correction in a direction corresponding to the direction in which elongation or contraction is to be made may be performed to the at least one image type data in at least one of the plurality of PDF data divided into plates and divided by the PDF division step and means, on the basis of the corresponding position data and the deformation information set in the deformation information input step and set by the deformation information input means.

(d) A case where a PDL data not divided into plates (e.g., a single PDL data (more specifically, a single PS data)) created by the layout editor and/or the imposition device or the layout edition software and/or the imposition software installed on a computer is once converted into a PDF data not divided into plates (e.g., a single PDF data), the converted PDF data not divided into plates is converted into a plurality of PDF data divided into plates respectively corresponding to the plurality of print images, and then the elongation/contraction correction is performed to the plurality of converted PDF data divided into plates. In this case, the correction step and means include a PDF conversion step and means for converting the PDL data not divided into plates (e.g., a single PDL data (more specifically, a single PS data)) into the PDF data not divided into plates (e.g., a single PDF data) and a PDF division step and means for dividing the PDF data not divided into plates (e.g., a single PDF data) and converted by the PDF conversion step and means into the plurality of PDF data divided into plates respectively corresponding to the plurality of print images. The elongation/contraction correction in a direction corresponding to the direction in which elongation or contraction is to be made may be performed to the at least one image type data in at least one of the plurality of PDF data divided into plates and converted by the PDF conversion step and means, and divided by the PDF division step and means, on the basis of the corresponding position data and the deformation information set by the deformation information input step and means.

The PDF data includes an object (characters, figures, and images) data as the image type data and includes a coordinate position data of the object (characters, figures, and images) as the position data for determining a position of the object (characters, figures, and images) data. Here, the object data includes a coordinate data indicating the shape of the object. In the method and device for creating print data according to the present invention, when the elongation/contraction correction of the PDF data is performed, the corresponding coordinate position data may be converted into coordinates so as to correspond to the shape of the printing medium on the basis of the deformation information set by the deformation information input step and means. The deformation includes not only the position but also deformation of the position information stored to indicate the shape of the object. In other words, the coordinate position data may be converted into coordinates corresponding to the shape of the printing medium after deformation on the basis of the deformation information. Accordingly, the coordinate position of the object (characters, figures, and images) included in the PDF data can be changed into the coordinate position corrected through the elongation/contraction correction. For example, in the deformation information input step and means, the deformation information on the elongation or contraction amount in the direction in which elongation or contraction is to be made in the printing medium at the time of printing may be set to with respect to the center of the printing medium in the direction crossing the transfer direction of the printing medium and/or the most downstream side of the printing medium in the transfer direction of the printing medium, and the coordinate position of the object (characters, figures, and images) in the direction corresponding to the transfer direction of the printing medium and/or the direction corresponding to the direction crossing the transfer direction of the printing medium may be changed on the basis of the deformation information and the coordinate position data of the object (characters, figures, and images).

According to the method and device for creating print data, of the present invention, in the deformation information input step and means, the deformation information corresponding to the printing conditions (e.g., quality of paper, pressure on paper, and the like) of the printing medium every time printing may be stored in a deformation information table, and the deformation information in the deformation information table may be automatically set on the basis of the printing conditions when the elongation/contraction correction is performed by the correction step and means.

ADVANTAGES OF THE INVENTION

According to the present invention described above, since the position correction control for the imaging unit in the printing plate creation device is not performed in performing a CTP printing process, it is not necessary to install a correction device in each imaging unit, thereby reducing cost for the device. In addition, since the image position at the time of creating the printing plates for the printing-plate creation data binarized (e.g., mesh-developed) is not corrected, it is possible to prevent deterioration in image quality due to the correction of the image position at the time of creating the printing plates. Furthermore, regardless of a difference in amount of deviation of the images between the most downstream side and the most upstream side in the transfer direction of the printing medium in a page due to a phenomenon, that is, a so-called fan-out phenomenon, that the printing medium is elongated (elongated in a trapezoidal shape) in the transfer direction and/or the direction crossing the transfer direction from the most downstream side to the most upstream side in the transfer direction of the printing medium, the positions of the previously printed print image and the subsequently printed print image can match with each other with excellent precision. As a result, it is possible to provide a method and a device for creating print data, in which print quality can be improved, a program for creating print data, and a computer-readable recording medium containing the program for creating print data.

BRIEF DESCRIPTION OF THE DRAWINGS

FIGS. 7A and 7C illustrate a configuration that a printing medium is subjected to printing by creating a printing plate using a printing plate creation device on the basis of printing-plate creation data and providing the created printing plate to a printing press and FIG. 7B illustrate a configuration that a printing plate is created using a DI printing press having a printing plate creation device on the basis of the printing-plate creation data and the printing medium is subjected to printing by the use of the created printing plate.

REFERENCE NUMERALS

10: PRINT DATA CREATION DEVICE
3: FILE DEVICE
7: RECORDING MEDIUM
70: PRINTING PRESS
Ac, Am, Ay, Ak: PRINTING PLATE
Dc, Dm, Dy, Dk: POSITION DATA
Hc, Hm, Hy, Hk: DEFORMATION INFORMATION
T1, T2, T3: IMAGE TYPE DATA
P: PRINT DATA CREATION PROGRAM
P1: DEFORMATIN INFORMATION INPUT MEANS
P2: CORRECTION MEANS
PDFc, PDFm, PDFy, PDFk: PRINT DATA
Q: PRINTING SHEET
X: 1'ST DIRECTION
X': 1'ST DIRECTION
y: 2ND DIRECTION Y': 2'ND DIRECTION

BEST MODE FOR CARRYING OUT THE INVENTION

Figure 1:
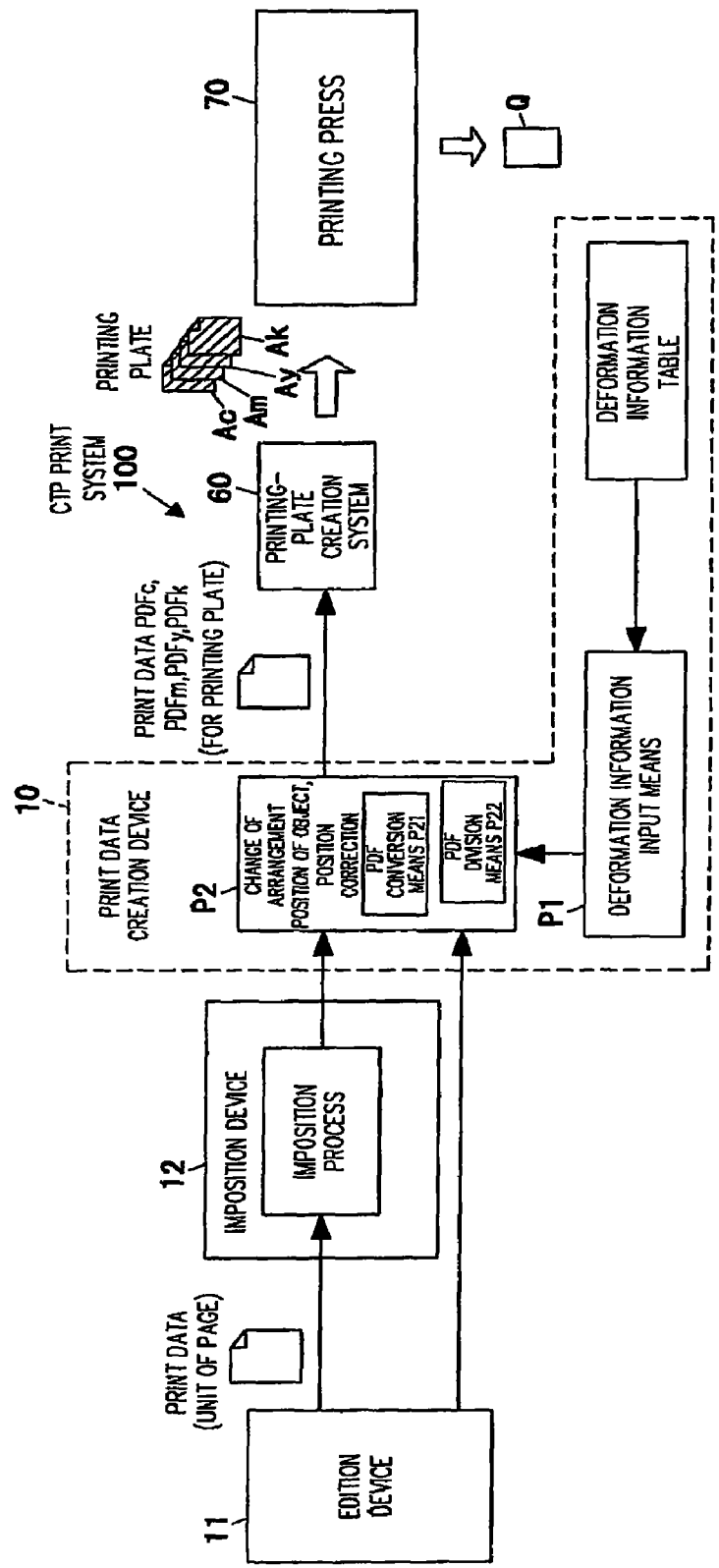
FIG. 1 is a diagram schematically illustrating a configuration of a CTP print system having a print data creation device for executing a print data creating method according to the present invention.

Hereinafter, embodiments of the present invention will be described with reference to the drawings. FIG. 1 is a diagram schematically illustrating a configuration of a CTP print system 100 having a print data creation device 10 for executing a print data creating method according to the present invention.

Figure 8:
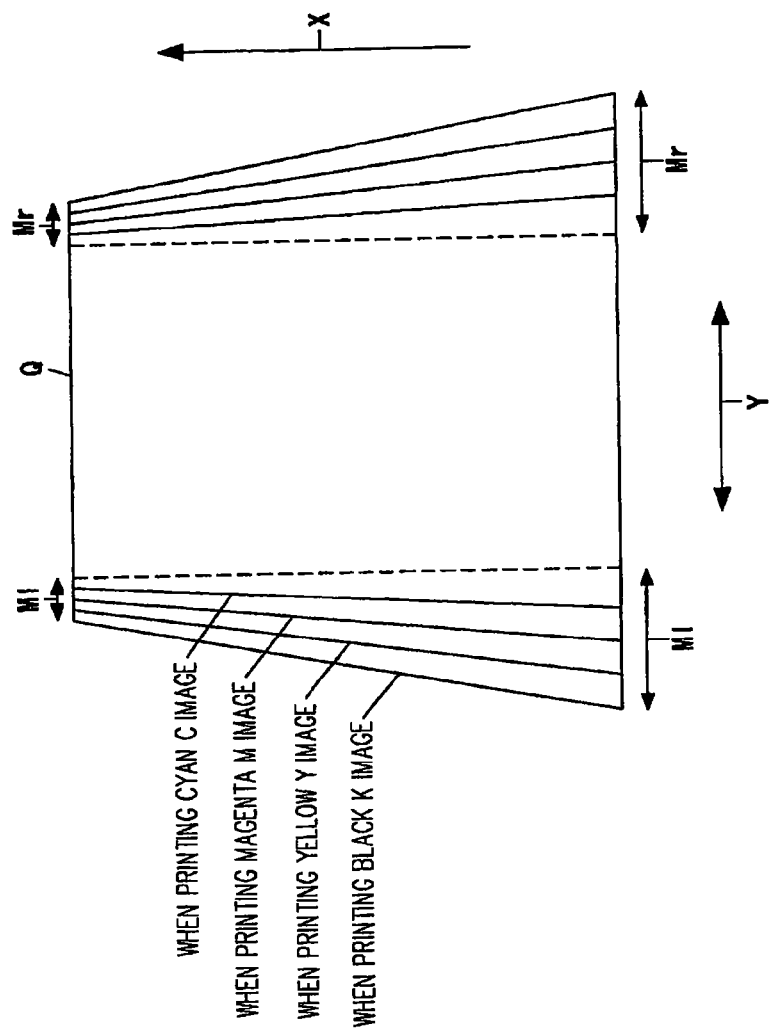
FIG. 8 is a diagram illustrating an example of an elongated state of a printing medium (e.g., printing sheet) being subjected to printing by a printing press using a plurality of printing plates.
Figure 9A:
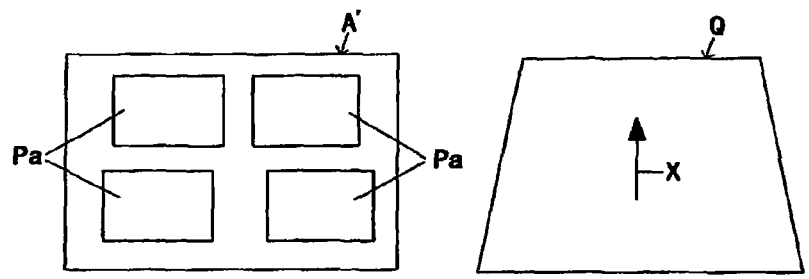
FIG. 9A is a diagram illustrating a conventional correction of position in units of a page and FIGS. 9B and 9C are diagrams illustrating a conventional correction of position due to a physical deformation of the printing plates.
Figure 9B:
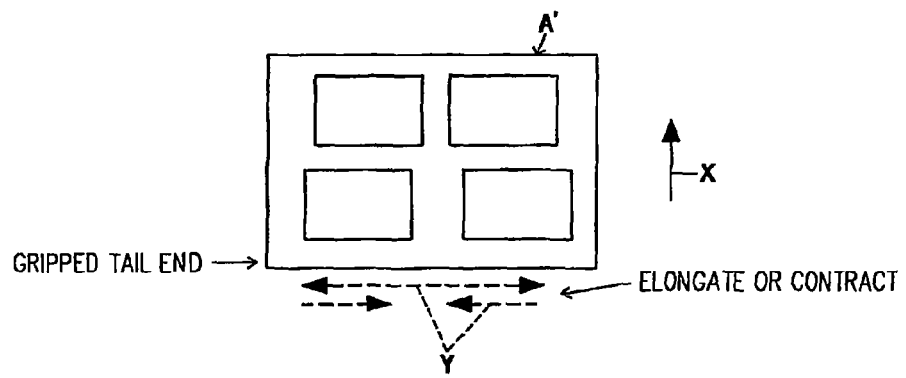
Figure 9C:
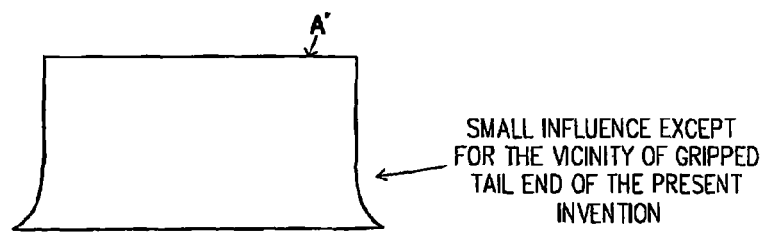

The CTP print system 100 shown in FIG. 1 includes the print data creation device 10 described above, a layout editor 11, an imposition device 12, a printing-plate creation system 60, and a printing press 70. The layout editor 11 or the print data creation device 10 connected to the imposition device 12 connected to the layout editor 11 is connected to the printing-plate creation system 60. The printing press 70 performs a printing operation by the use of printing plates created by the printing-plate creation system 60. In the CTP print system 100, a plurality of print data respectively corresponding to a plurality of print images, that is, four print data PDFc, PDFm, PDFy, and PDFk (print data for printing plate) respectively corresponding to print images of four different basic colors of cyan (C), magenta (M), yellow (Y), and black (K) in the present example, are created by the print data creation device 10. For example, in the printing-plate creation system 60, the thus created print data PDFc, PDFm, PDFy, and PDFk are converted into printing-plate creation data (e.g., raster data developed in a bit map) and the converted printing-plate creation data are binarized (e.g., dot-processed) by a printing-plate-creation-data producing device not shown, printing plates Ac, Am, Ay, and Ak are created by the printing plate creation device not shown on the basis of the binarized (e.g., dot-processed and meshed developed) printing-plate creation data, and the created printing plates Ac, Am, Ay, and Ak are provided in the printing press 70, whereby the four kinds of print images are sequentially printed on a printing medium (here, a printing sheet Q). In the printing press 70 according to the present example, as shown in FIG. 8, when the printing sheet Q is transferred in a predetermined transfer direction (first direction X), the printing sheet Q may be gradually elongated (elongated in a trapezoid shape) in the first direction X and/or a direction (second direction Y) crossing the first direction X from the most downstream side of the printing sheet Q to the most upstream side in the first direction X at the time of printing.

In this way, in the CTP print system 100, the layout editor 11 or the print data creation device 10 connected to the imposition device 12 connected to the layout editor 11 serves to create the print data PDFc, PDFm, PDFy, and PDFk. The creation of the print data will be described in more detail with reference to FIGS. 1 and 2.

The layout editor 11 shown in FIG. 1 edits a document including at least one image type among a character, a figure, and an image, and converts the document into PS data or PDF data at the time of outputting the edited document. The imposition device 12 regularly arranges pages on the printing plate so that the pages are correctly arranged in the order of page numbers at the time of folding in a bookbinding process.

Figure 2:
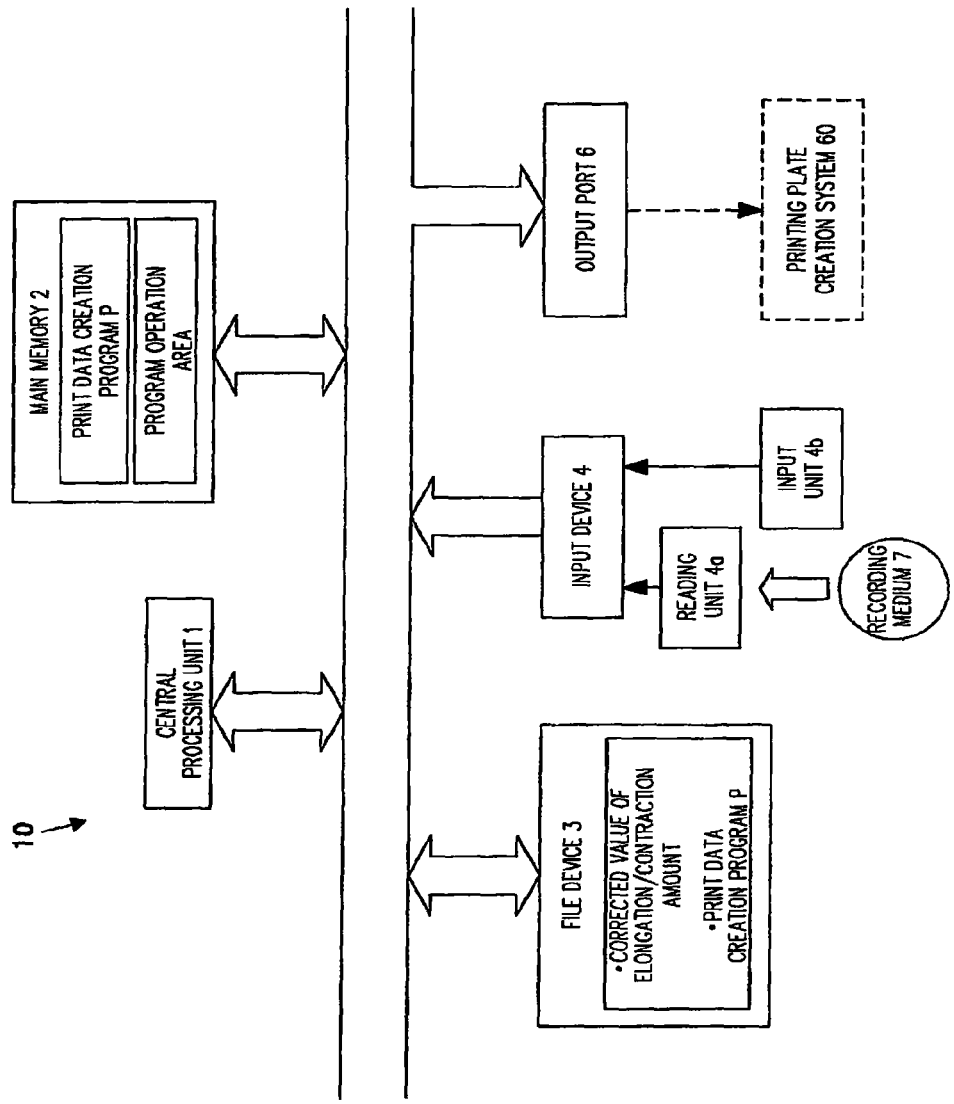
FIG. 2 is a schematic block diagram illustrating the print data creation device shown in FIG. 1.
Figure 3:
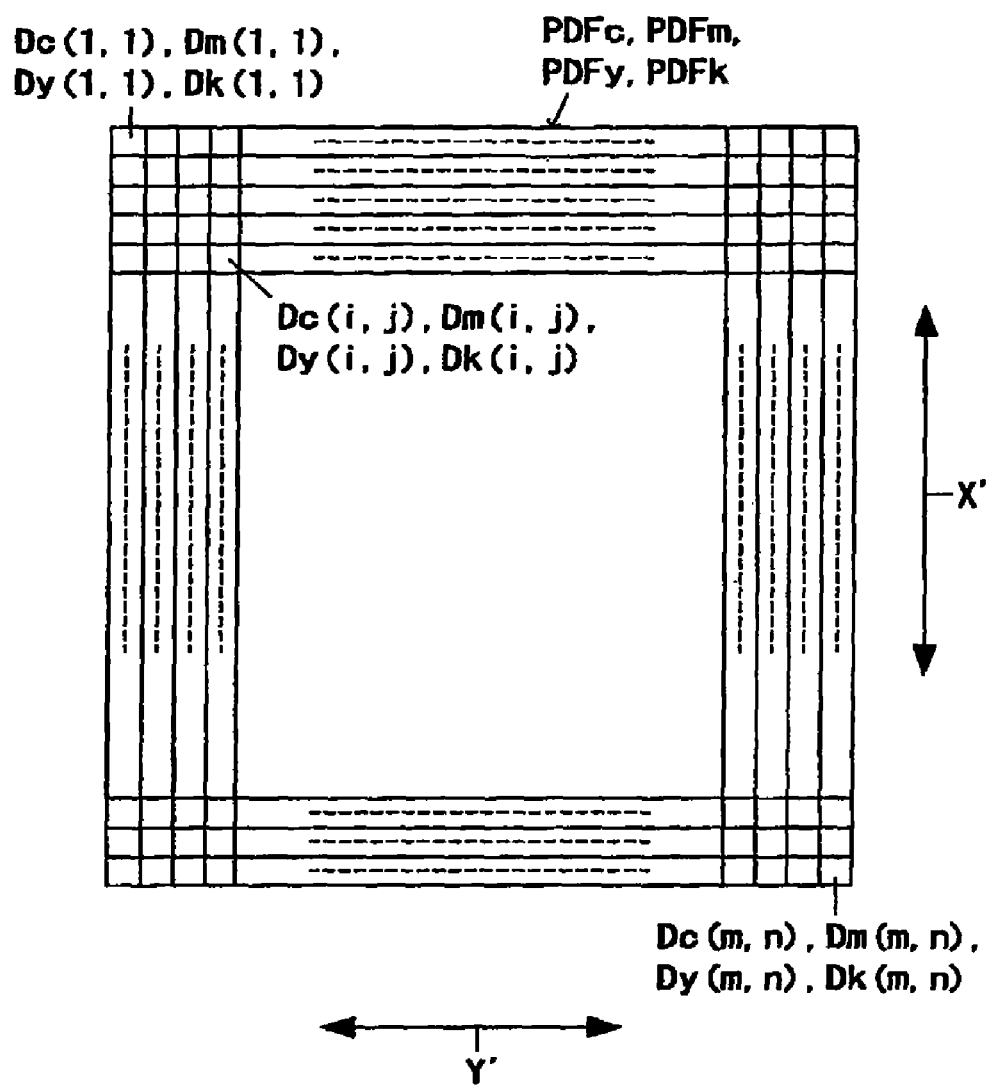
FIG. 3 is a diagram illustrating a coordinate position data in the print data.

A schematic block diagram illustrating the print data creation device 10 of FIG. 1 is shown in FIG. 2. The print data creation device 10 shown in FIG. 2 is constructed by installing a print data creation program on a computer, and can create the print data PDFc, PDFm, PDFy, and PDFk corresponding to the four kinds of print images. Each of the print data PDFc, PDFm, PDFy, and PDFk includes image type data for at least one image type constituting the print image and position data for determining a position of the image type data in the print image and a shape of the image type data indicating a shape of the image type data. In this embodiment, the print data are electronic document format data including object (characters, figures, and images) data and coordinate position data of the objects for determining the positions and shapes of the objects (characters, Figures, and images) and are PDF (Portable Document Format) data developed by Adobe Systems Co. Schematically describing the PDF data with reference to FIG. 3, in the PDF data PDFc, PDFm, PDFy, and PDFk, as shown in FIG. 3, the coordinate position data $Dc(i,j)$, $Dm(i,j)$, $Dy(i,j)$, and $Dk(i,j)$ (where $i=1$ to m, and $j=1$ to n) include m coordinate (where m is an integer of 2 or more) in the 2'nd direction (the Y' direction in FIG. 3) corresponding to the 2nd direction Y (see FIG. 8) of the printing sheet Q and n coordinate (where n is an integer of 2 or more) in the 1'st direction (the X' direction in FIG. 3) corresponding to the 1st direction X (see FIG. 8). The position of the object (characters, figures, and images) data is determined by the coordinate position data. The coordinate position data can determine the positions of the objects and the shapes of the objects. The character data among the object data are code data capable of expressing characters by the use of predetermined codes, the figure data are vector data such as CAD data capable of expressing figures by the use of such as a plurality of coordinate information using numerical expressions or the like, and the image data are raster data capable of expressing images by the use of such as a plurality of pixel information such as photograph images or scanned images scanned by a scanner or the like.

As shown in FIG. 2, the print data creation device 10 includes a central processing unit 1, a main memory 2, a file device 3, an input device 4, and an output port 6, and serves to create the print data PDFc, PDFm, PDFy, and PDFk having been subjected to the layout edition process and/or the imposition process and to send the created print data PDFc, PDFm, PDFy, and PDFk to the printing-plate creation system 60 through the output port 6.

The input device 4 includes a read unit 4a capable of reading out program information from a computer-readable recording medium 7 containing the print data creation program P and an input unit 4b such as a mouse or a keyboard. The file device 3 can store the program information read out from the recording medium 7 and can store deformation information to be described (here, deformation information corresponding to printing conditions (e.g., quality of paper, pressure on paper, or the like)), which can be used for the program P, in a deformation information table. The main memory 2 can read out the program information stored in the file device 3 and has a program operation area. The central processing unit 1 can create the print data PDFc, PDFm, PDFy, and PDFk on the basis of the print data creation program P read out into the main memory 2.

As shown in FIG. 1, the print data creation program P allows the computer to serve as means including a deformation information input means P1 and a correction means P2.

Figure 4:
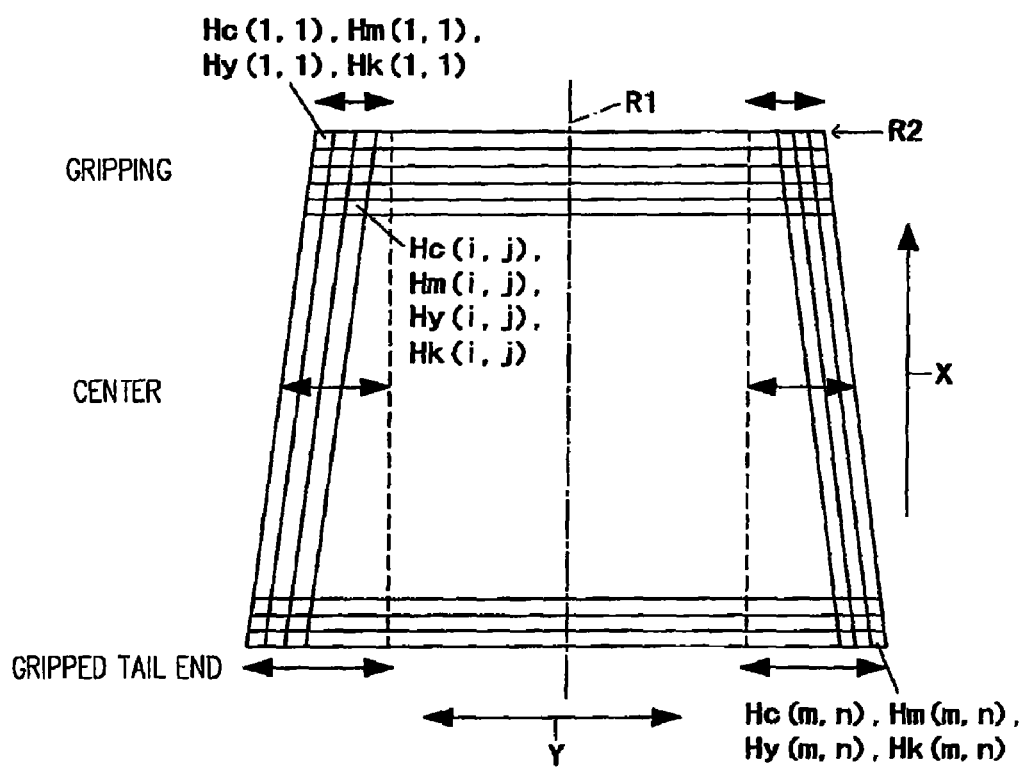
FIG. 4 is a diagram illustrating deformation information corresponding to printing conditions of a printing sheet at the time of printing with respect to the center line (longitudinal dotted line in the Figure) of the printing medium in the direction crossing a transfer direction of the printing medium and/or the most downstream side of the printing medium in the transfer direction of the printing medium every time of printing such as cyan image printing, magenta image printing, yellow image printing, and black image printing.

The deformation information input means P1 sets deformation information on the amount of elongation or contraction in the direction in which elongation or contraction of the printing sheet Q is to be made at the time of printing the four kinds of print images on the printing sheet Q by the use of the four printing plates Ac, Am, Ay, and Ak. More specifically, with respect to the center in the 2nd direction Y of the printing sheet Q and/or the most downstream side in the 1st direction of the printing sheet Q, the deformation information corresponding to the printing condition of the printing sheet Q at the time of printing is stored in the deformation information table of the file device 3. That is, as shown in FIG. 4, with respect to the center line R1 (long dotted line in FIG. 4) in the 2nd direction Y of the printing sheet Q and/or the most downstream side R2 in the 1st direction X of the printing sheet Q every time of printing a cyan image, a magenta image, a yellow image, and a black image, the deformation information Hc(i,j), Hm(i,j), Hy(i,j), and Hk(i,j) (where i=1 to m, and j=1 to n) corresponding to the coordinate position data Dc(i, j), Dm(i,j), Dy(i,j), and Dk(i,j) (see also FIG. 3) and corresponding to the printing conditions of the printing sheet Q is obtained, the deformation information Hc(i,j), Hm(i,j), Hy(i, j), and Hk(i,j) is stored in the deformation information table in the file device 3. When the elongation/contraction correction is performed by the correction means P2, the deformation information Hc(i,j), Hm(i,j), Hy(i,j), and Hk(i,j) in the deformation information table is automatically set on the basis of the printing conditions.

The correction means P2 performs the elongation/contraction correction in the direction corresponding to the direction in which elongation or contraction is to be made to the at least one image type data constituting at least one of the four kinds of print images, on the basis of the corresponding position data and the deformation information set by the deformation information input means P1. More specifically, in the present embodiment, the correction means P2 includes a PDF conversion means P21 and a PDF division means P22. In the correction means including the PDF conversion means P21 and the PDF division means P22, the elongation/contraction correction in the direction corresponding to the direction in which elongation or contraction is to be made is performed to all the object data constituting the print images in the PDF data on the basis of the corresponding coordinate position data and the deformation information Hc(i,j), Hm(i,j), Hy(i, j), and Hk(i,j) set by the deformation information input means P1. That is, as for all the object data constituting the print images, the coordinate position data Dc(i,j), Dm(i,j), Dy(i,j), and Dk(i,j) for determining the position and shape of the corresponding object are converted in coordinates so as to be the position of the object corresponding to shape of the printing sheet Q and the shape of the object, on the basis of the deformation information Hc(i,j), Hm(i,j), Hy(i,j), and Hk(i,j) set by the deformation information input means P1. In other words, the coordinate position data Dc(i,j), Dm(i,j), Dy(i,j), and Dk(i,j) are converted into coordinates corresponding to the shape of the printing sheet Q after deformation on the basis of the deformation information Hc(i,j), Hm(i,j), Hy(i,j), and Hk(i,j).

Prior to performing the elongation/contraction correction, examples of creating the PDF data can include a case where the PDF data are directly created by the layout editor 11 and/or the imposition device 12 and a case where the PDF data are obtained on the basis of the PS data created by the layout editor 11 and/or the imposition device 12. In any case, the PDF data are created as four PDF data (that is, four PDF data divided into plates) PDFc, PDFm, PDFy, and PDFk respectively corresponding to the four kinds of print images, and the PDF data are subjected to the elongation/contraction correction at the time of creating the print data as follows.

(a) A case where the elongation/contraction correction is performed to four PDF data, divided into plates, respectively corresponding to the four kinds of print images created by the layout editor 11 and/or the imposition device 12. In this case, the print data creation device 10 performs, by the use of the correction means P2, the elongation/contraction correction in the direction (e.g., the 1'st direction X' and/or the 2'nd direction Y') corresponding to the direction, in which elongation or contraction is to be made, to all the object (characters, figures, and images) data in the PDF data PDFc, PDFm, PDFy, and PDFk, divided into plates, corresponding to the print images, on the basis of the corresponding coordinate position data and the deformation information set by the deformation information input means P1.

(b) A case where four PS data, divided into plates, respectively corresponding to the four kinds of print images created by the layout editor 11 and/or the imposition device 12 are once converted into four PDF data, divided into plates, respectively corresponding to the print images, and then the elongation/contraction correction is performed to the four converted PDF data. In this case, the print data creation device 10 performs, by the use of the PDF conversion means P21 of the correction means P2, converts the four PS data divided into plates corresponding to the four kinds of print images into the four PDF data PDFc, PDFm, PDFy, and PDFk divided into plates respectively corresponding thereto, and performs the elongation/contraction correction in a direction (e.g., the 1'st direction X' and/or the 2'nd direction Y') corresponding to the direction, in which elongation or contraction is to be made direction, to all the object (characters, figures, and images) data in the PDF data PDFc, PDFm, PDFy, and PDFk divided into plates and converted by the PDF conversion means P21, on the basis of the corresponding coordinate position data and the deformation information set by the deformation information input mean P1.

(c) A case where single PDF data not divided into plates created by the layout editor 11 and/or the imposition device 12 is divided into four PDF data divided into plates respectively corresponding to the four kinds of print images, and then the elongation/contraction correction is performed to the four PDF data divided into plates. In this case, the print data creation device 10 divides, by the use of the correction means P2, the single PDF data not divided by the PDF division means P22 into the four PDF data PDFc, PDFm, PDFy, and PDFk divided into plates respectively corresponding to the four kinds of print images, and performs the elongation/contraction correction in a direction (e.g., the 1'st direction X' and/or the 2'nd direction Y') corresponding to the direction, in which elongation or contraction is to be made, to all the object (characters, figures, and images) data in the PDF data PDFc, PDFm, PDFy, and PDFk divided by the PDF conversion means P21, on the basis of the corresponding coordinate position data and the deformation information set by the deformation information input means P1.

(d) A case where single PS data not divided into plates and created by the layout editor 11 and/or the imposition device 12 is once converted into single PDF data not divided into plates, the converted single PDF data not divided into plates is divided into the four PDF data divided into plates respectively corresponding to the four kinds of print images, and then the elongation/contraction correction is performed to the four PDF data divided into plates. In this case, the print data creation device 10 converts, by the use of the PDF conversion means P21 of the correction means P2, the single PS data not divided into plates, into the single PDF data not divided into plates, divides the single PDF data not divided into plates and converted by the PDF conversion means P21 into the four PDF data PDFc, PDFm, PDFy, and PDFk divided into plates respectively corresponding to the four kinds of print images by the PDF division means P22, and performs the elongation/contraction correction in a direction (e.g., the 1'st direction X' and/or the 2'nd direction Y') corresponding to the direction, in which elongation or contraction is to be made, to all the object (characters, figures, and images) data in the PDF data PDFc, PDFm, PDFy, and PDFk converted by the PDF conversion means P21 and divided by the PDF division means P22, on the basis of the corresponding coordinate position data and the deformation information set by the deformation information input means P1.

Figure 5:
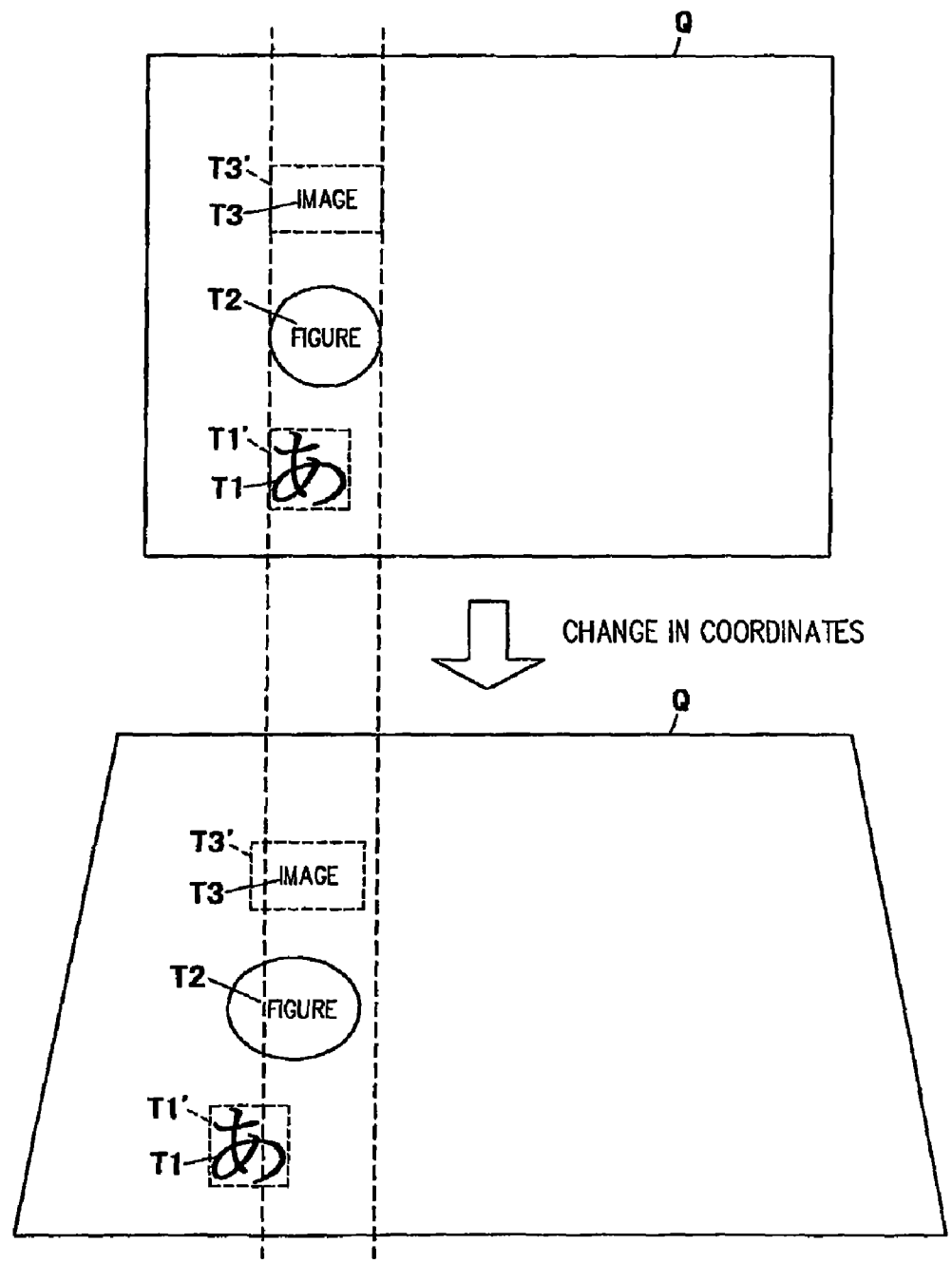
FIG. 5 is a diagram illustrating a state where the coordinate position data for determining a position and a shape of an object is converted in coordinates so as to correspond to the shape of the sheet on the basis of the deformation information.

In this way, as shown in FIG. 5, the coordinate position data Dc(i,j), Dm(i,j), Dy(i,j), and Dk(i,j) (see FIG. 3) for determining the positions and the shapes of the objects (character T1, figure T2, and image T3) are converted in coordinates so as to correspond to the shape of the printing sheet Q on the basis of the deformation information Hc(i,j), Hm(i,j), Hy(i,j), and Hk(i,j) (see FIG. 4). In other words, the coordinate position data Dc(i,j), Dm(i,j), Dy(i,j), and Dk(i,j) are converted in coordinates so as to correspond to the positions and the shapes of the objects corresponding to the printing sheet Q after deformation on the basis of the deformation information Hc(i,j), Hm(i,j), Hy(i,j), and Hk(i,j). Accordingly, the coordinate positions of the objects (character T1, figure T2, and image T3) included in the PDF data PDFc, PDFm, PDFy, and PDFk can be changed to the coordinate positions with the elongation/contraction correction performed thereto. In FIG. 5, an example of correction in the 2'nd direction Y' corresponding to the 2nd direction Y of the printing sheet Q is shown, while the coordinate positions of the objects (character T1, figure T2, and image T3) may be changed in the same manner in the 1'st direction X' corresponding to the 1st direction X. One of the 1'st direction X' and the 2'nd direction Y' may be fixed and the other may be subjected to the elongation/contraction correction.

Here, when the data of the character T1 is data of an outlined character, it can be handled as figure data (vector data) which can be expressed by, for example, a plurality of coordinate information by using numerical expressions or the like. Then, the kinds of the object data substantially become two kinds of data of the image T3 and the figure T2. The character T1 and the image T3 may be changed in magnification and in coordinates in the direction corresponding to the 1'st direction X' and/or the 2'nd direction Y' according to needs and circumstances. In this way, it is possible to correct the coordinate position data in the circumscribed rectangles T1' and T3' (see FIG. 5) of the magnification-changed character Ti and the magnification-changed character T3.

Figure 6:
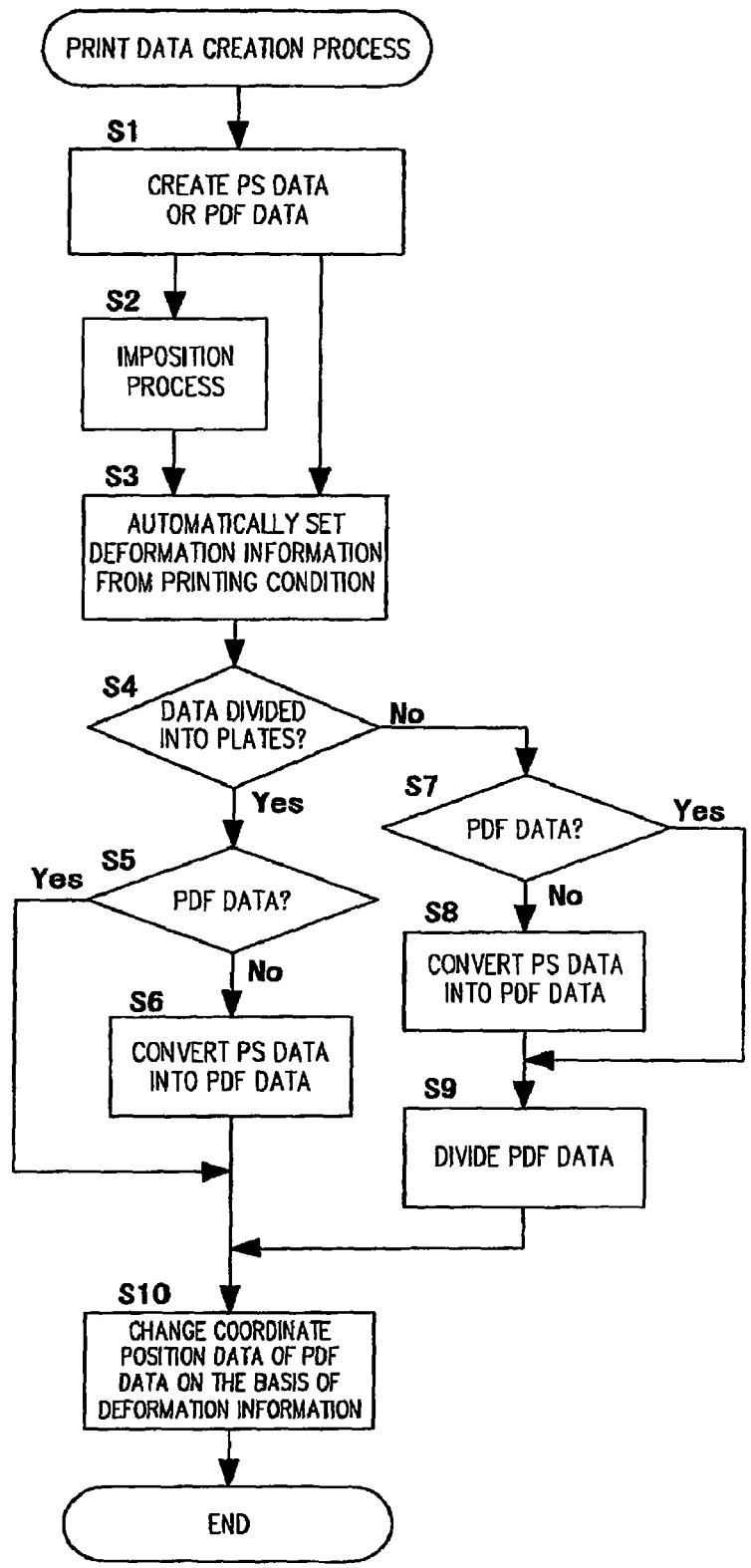
FIG. 6 is a flowchart illustrating a flow of a print data creating process.
Figure 7A:
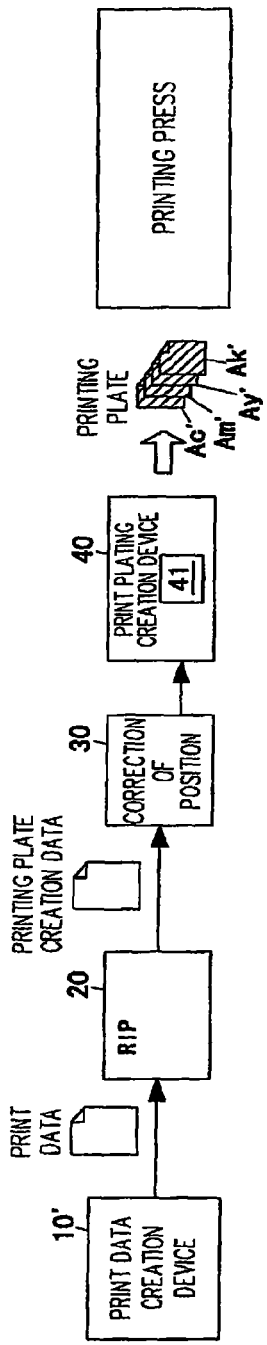
FIGS. 7A, 7B, and 7C are diagrams schematically illustrating configurations of conventional CTP print techniques, where
Figure 7B:
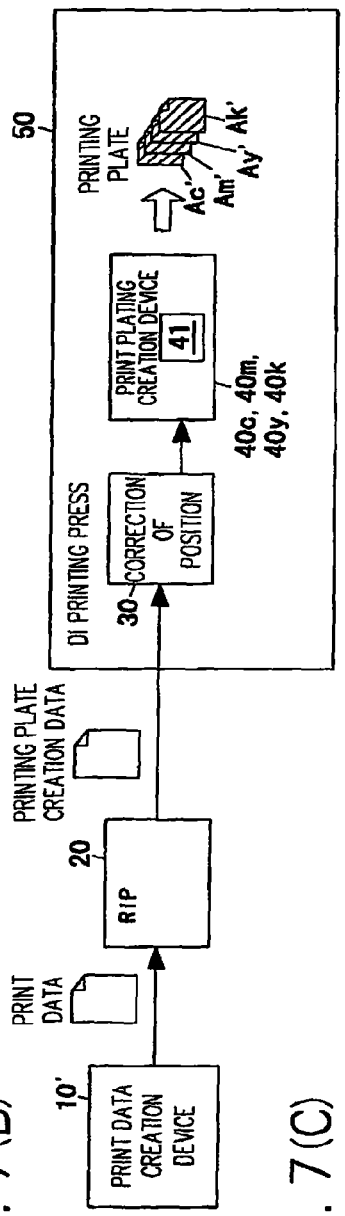
Figure 7C:
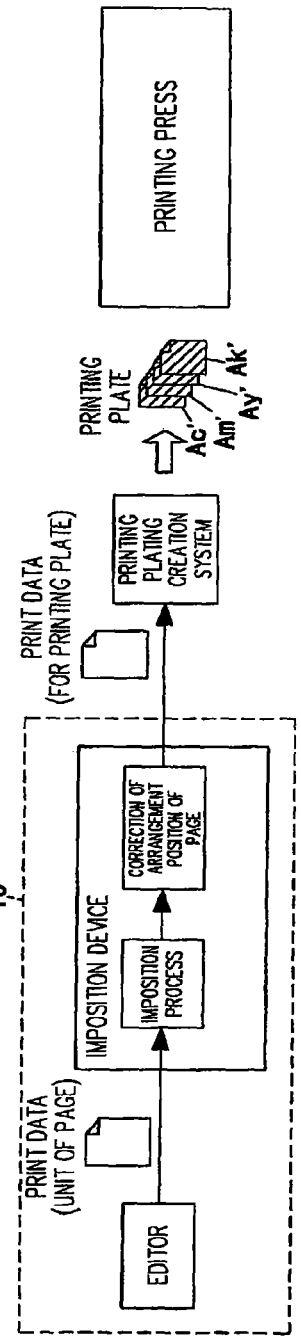

FIG. 6 is a flowchart illustrating a flow of the print data creating process. In this process, the PS data or the PDF data are first created by the layout editor 11 (Step S1), the created PS data or the created PDF data are imposed as needed by the imposition device 12 (Step S2), and then the deformation information in the deformation information table of the file device 3 is automatically set on the basis of the printing conditions by the deformation information input means P1 (Step S3).

Then, as shown in FIG. 1, the print data in units of a printing plate from the layout editor 11 and/or the imposition device 12 is subjected to the elongation/contraction correction by the correction means P2 (Steps S4 to S10).

That is, the correction means P2 directly proceeds to Step S10 in a case where the data created by the layout editor 11 and/or the imposition device 12 are data divided into plates respectively corresponding to the four kinds of print images (Step S4) and the four PDF data PDFc, PDFm, PDFy, and PDFk (Step S5), while the correction means P2 proceeds to Step S10 after the data are once converted into the PDF data PDFc, PDFm, PDFy, and PDFk divided into plates respectively corresponding thereto by the PDF conversion means P21 (Step S6) in a case where the data are data divided into plates respectively corresponding to the four kinds of print images (Step S4) and are the PS data (Step S5).

In a case where the data created by the layout editor 11 and/or the imposition device 12 are data not divided into plates (Step S4) and are the single PDF data (Step S7), the data are once divided into the PDF data PDFc, PDFm, PDFy, and PDFk divided input plates respectively corresponding to the four kinds of print images by the PDF division means P22 (Step S9) and then the process proceeds to Step S10. In a case where the data are data not divided into plates (Step S4) and are the single PS data (Step S7), the data are once converted into the single PDF data not divided into plates by the PDF conversion means P21 (Step S8), the converted single PDF data not divided into plates is divided into the PDF data divided into plates respectively corresponding to the four kinds of print images by the PDF division means P21 (Step S9), and then the process proceeds to Step S10.

On the other hand, in Step S10, as for all the object (character T1, figure T2, and image T3) data in the PDF data PDFc, PDFm, PDFy, and PDFk divided into plates respectively corresponding to the print images, the positions and the shapes of the objects are changed on the basis of the corresponding coordinate position data (see FIG. 3) and the deformation information (see FIG. 4) set by the deformation information input means P1, and the elongation/contraction correction in a direction (e.g., the 1'st direction X' and/or the 2'nd direction Y') corresponding to the elongation/contraction direction is performed (see FIG. 5).

As described above, in the print data creation device 10 and the print data creation program P, since the elongation/contraction correction of the print data PDFc, PDFm, PDFy, and PDFk is performed prior to creating the printing plate by the use of the printing plate creation device of the CTP printing method or the printing plate creation device installed in the DI printing press, the position correction control of the imaging unit in the printing plate creation device does not have to be performed. Accordingly, since it is not necessary to install a correction device in each imaging unit, it is possible to reduce the cost for the device as much and to stably operate the printing plate creation device. In addition, since the print data PDFc, PDFm, PDFy, and PDFk are subjected to the elongation/contraction correction and the binarizing process prior to binarizing the printing-plate creation data, the image positions in the binarized printing-plate creation data does not have to be performed at the time of creating the printing plates. Accordingly, it is possible to prevent deterioration in print quality due to the correction of the image positions at the time of creating the printing plates.

In the correction means P2, all the object (character, figure, and image) data constituting the print images are subjected to the elongation/contraction correction in a direction (e.g., the 1'st direction X' and/or the 2'nd direction Y') corresponding to the direction, in which elongation or contraction is to be made, on the basis of the corresponding coordinate position data and the deformation information set by the deformation information input means P1. Accordingly, for example, even when the phenomenon, that is, the so-called fan-out phenomenon, that the printing sheet Q is elongated in the transfer direction X and/or the direction Y crossing the transfer direction X from the most downstream side to the most upstream side in the transfer direction of the printing sheet Q occurs and thus the amount of deviation in a page is different between the most downstream side and the most upstream side in the transfer direction X, it is possible to create the print data so as to be more close to the deformed shape of the printing sheet Q, by performing the elongation correction in the transfer direction X and/or the direction Y closing the transfer direction X from the most downstream side to the most upstream side in the transfer direction X of the printing sheet Q. Accordingly, it is possible to match the positions of the previously printed print image and the subsequently printed print image with excellent precision, thereby improving the print quality.

In the above-mentioned embodiment, the print data PDFc to PDFk of cyan, magenta, yellow, and black each are subjected to the elongation/contraction correction, but the elongation/contraction correction may be performed to at least one thereof. When no image is initially formed on the printing medium Q or when an image is initially formed on the printing medium but the positioning between the formed image and an image to be printed does not have to be performed, the elongation/contraction correction of the corresponding print data may be omitted.

The invention claimed is:

1. A method of creating print data, in which prior to creating in a raster image processor binary image data including a plurality of printing-plate creation data for respectively creating a plurality of printing plates for sequentially printing a plurality of print images on a printing medium, a plurality of print data, each to adjust one or more of position and shape of a print image of the plurality of print images, is created without performing mechanical position or shape correction in a printing device, wherein each of the plurality of print data includes an image type data for at least one image type constituting the corresponding print image, and a position data for determining at least one of an image type position data corresponding to a position of the image type in the print image and an image type shape data indicating a shape of the image type, wherein creating the print data includes:

determining deformation information on an amount of elongation or contraction in a direction in which the printing medium is to be elongated or contracted based on a previously printed print image when the previously printed print image is made in a printing operation for the plurality of print images on the printing medium by the use of the plurality of printing plates;

adjusting one or more of the position and the shape of the print image without performing mechanical position or shape correction in the printing device, wherein the adjusting includes correcting at least one position data in terms of elongation or contraction in the direction in which the printing medium is to be elongated or contracted, by changing one or both of the image type position data and the image type shape data on the basis of the deformation information; and generating the print data subjected to the correcting in terms of elongation or contraction, wherein after the print data is created the print data is binarized for creating printing-plate creation data.

2. The method of creating print data according to claim 1, wherein the deformation information corresponds to a print condition of the printing medium when each print is made, wherein the deformation information is stored in a deformation information table, and the deformation information in the deformation information table is automatically set on the basis of the print condition when elongation or contraction correction is performed.

3. An article of manufacture comprising: a non-transitory computer-readable storage media providing instructions which, when executed by a computer, cause the computer to perform a method for adjusting one or more of position and shape of a print image without performing mechanical position correction in a printing device, the instructions including:

instructions to create print data for the print image prior to creating binary image data including printing-plate creation data for printing the print image on a printing medium using a plurality of printing plates, wherein the print data for the print image includes an image type data for an image type corresponding to the print image, and a position data for determining one or more of an image type position data corresponding to a position of the image type in the print image and an image type shape data indicating a shape of the image type in the print image, wherein the instructions to create the print data for the print image include:

instructions to determine deformation information of a print image downstream from the print image during printing of the downstream print image in the printing device, the deformation information indicating an amount of elongation or contraction correction to be applied to the printing medium in a direction the printing medium is to be elongated or contracted;

instructions to adjust one or more of the position and the shape of the print image without performing mechanical position or shape correction in the printing device including correcting the image type data of the print image by changing the position of the image type data in the print image and the shape of the image type data in the print image based on corresponding position data and the deformation information of the downstream print image; and instructions for generating the print data for the print image based on the corrected image type data of the print image to match print positions of the print image with corresponding print positions of the downstream print image, wherein the generating the print data occurs prior to binarizing the print data for the creation of printing-plate creation data.

4. An article of manufacture comprising:

a non-transitory computer-readable recording medium containing instructions, which when executed by a computer, cause the computer to perform a method for creating print data, the instructions including:

instructions to create print data for printing a print image in a printing device, in which the print data is created before creating binary image data including a plurality of printing-plate creation data for printing the print image on a printing medium using a plurality of printing plates, wherein the print data includes an image type data including an image type of the print image and a position data including one or more of an image type position data corresponding to a position of the image type in the print image and an image type shape data indicating a shape of the image type in the print image, wherein the instructions for creating the print data include:

instructions to determine deformation information on an amount of elongation or contraction in a direction in which the printing medium is to be elongated or contracted based on a previously printed print image while the previously printed print image is being printed to the printing medium using the plurality of printing plates;

instructions to adjust one or more of the position and the shape of the print image without performing mechanical position or shape correction in the printing device including correcting the image type data of the print image in terms of elongation or contraction in the direction in which the printing medium is to be elongated or contracted by changing the position of the image type data and the shape of the image type data based on corresponding position data and the deformation information of the previously printed print image; and instructions to generate the print data for the print image subjected to the elongation or contraction correction prior to binarizing the print data for creating printing-plate creation data.

5. A method comprising:

creating print data for a print image prior to creating binary image data in a raster image processor (RIP) including printing-plate creation data for printing the print image on a printing medium using a plurality of printing plates in a printing device, wherein the print data includes image type data corresponding to an image type of the print image, and a position data for determining one or more of an image type position data corresponding to a position of the image type in the print image and an image type shape data indicating a shape of the image type in the print image, wherein creating the print data for the print image includes:

determining deformation information of a print image downstream from the print image during printing of the downstream print image, the deformation information including an amount of elongation or contraction correction to be applied to the printing medium in a direction the printing medium is to be elongated or contracted;

adjusting one or more of the position and the shape of the print image without performing mechanical position or shape correction in the printing device, wherein the adjusting includes correcting the position data and the image type data of the print image by changing the position of the image type data and the shape of the image type data based on the deformation information of the downstream print image; and generating the print data for the print image based on the corrected position data and image type data to match print positions of the print image with corresponding print positions of the downstream print image prior to binarizing the print data.

* * * * *